（12）United States Patent
Kashima et al.

(10) Patent No.: US 10,437,452 B2
(45) Date of Patent: Oct. 8, 2019

(54) INFORMATION PROCESSING APPARATUS FOR DISPLAYING CONTENT ON A SCREEN OF A DISPLAY DEVICE

(71) Applicant: Rakuten, Inc., Tokyo (JP)

(72) Inventors: Rei Kashima, Tokyo (JP); Takehiro Ogita, Tokyo (JP); Junko Takemoto, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 248 days.

(21) Appl. No.: 14/651,058

(22) PCT Filed: May 20, 2013

(86) PCT No.: PCT/JP2013/063971
§ 371 (c)(1),
(2) Date: Jun. 10, 2015

(87) PCT Pub. No.: WO2014/188497
PCT Pub. Date: Nov. 27, 2014

(65) Prior Publication Data
US 2015/0324079 A1   Nov. 12, 2015

(51) Int. Cl.
*G06F 3/0485* (2013.01)
*G06F 3/0484* (2013.01)
*G06F 3/0481* (2013.01)

(52) U.S. Cl.
CPC .......... *G06F 3/0485* (2013.01); *G06F 3/0481* (2013.01); *G06F 3/04842* (2013.01)

(58) Field of Classification Search
CPC .... G06F 17/30; G06F 3/0481; G06F 3/04842; G06F 3/0485
See application file for complete search history.

(56) References Cited

U.S. PATENT DOCUMENTS

2009/0049385 A1* 2/2009 Blinnikka ............ G06F 3/0481
715/719
2009/0172594 A1* 7/2009 Chen ................... G06F 3/04817
715/810
(Continued)

FOREIGN PATENT DOCUMENTS

| JP | 2007-531128 A | 11/2007 |
| JP | 2008-210061 A | 9/2008 |
| JP | 2009-193196 A | 8/2009 |

OTHER PUBLICATIONS

Communication from the Japanese Patent Office dated Sep. 30, 2014 in counterpart Japanese Patent Application No. 2014-535839.
(Continued)

*Primary Examiner* — Tan H Tran
(74) *Attorney, Agent, or Firm* — Sughrue Mion, PLLC

(57) ABSTRACT

There is provided an information processing apparatus which makes it easier to avoid a condition in which the viewing of on-screen elements included in a web page is interfered with.
An information processing apparatus displays a main display area that represents content of a web page on a screen of a display device. The information processing apparatus identifies, among a plurality of on-screen elements of interest, an on-screen element of interest that enters or departs from the main display area as the web page is scrolled along a given scrolling direction, when the web page that includes the plurality of on-screen elements of interest and that can be scrolled along the given scrolling direction appears in the main display area. The information processing apparatus also determines whether or not to include the identified on-screen element of interest as a target to be displayed in a subordinate display area that appears at a position overlapping the main display area in response to the entry or
(Continued)

departure of the identified on-screen element of interest into or from the main display area.

8 Claims, 7 Drawing Sheets

(56) References Cited

U.S. PATENT DOCUMENTS

| | | | | |
|---|---|---|---|---|
| 2012/0010995 A1* | 1/2012 | Skirpa | ............... | G06F 3/0481 |
| | | | | 705/14.49 |
| 2013/0179836 A1* | 7/2013 | Han | ............... | G06F 3/0482 |
| | | | | 715/810 |
| 2013/0222435 A1* | 8/2013 | Choi | ............... | G06F 3/0482 |
| | | | | 345/684 |
| 2014/0129980 A1* | 5/2014 | Lee | ............... | G06F 3/04883 |
| | | | | 715/810 |

OTHER PUBLICATIONS

International Search Report for PCT/JP2013/063971 dated Jul. 23, 2013.

Communication from International Searching Authority dated Jul. 23, 2013 in counterpart International Application No. PCT/JP2013/063971.

* cited by examiner ly display a web page in a window (main display area) that
INFORMATION PROCESSING APPARATUS FOR DISPLAYING CONTENT ON A SCREEN OF A DISPLAY DEVICE

CROSS REFERENCE TO RELATED APPLICATIONS

This application is a National Stage of International Application No. PCT/JP2013/063971 filed May 20, 2013, the contents of all of which are incorporated herein by reference in their entirety.

TECHNICAL FIELD

The present invention relates to an information processing apparatus for controlling the display of a web page, a control method and a control program of the same, and a server device.

BACKGROUND ART

An information processing apparatus is known which displays a web page in a window (main display area) that occupies part or the whole of the display screen by implementing the web browser program. Here, if the web page is in a size that does not fit into the main display area, the user can display a desired position of the web page within the main display area by scrolling. However, such control may cause important information of the web page to scroll out of the main display area such that the important information is not displayed. For this reason, techniques are under study to continuously display, for example, important buttons in the main display area (refer, for example, to Patent Literature 1).

CITATION LIST

Patent Literature

[Patent Literature 1]
Japanese Patent Laid-Open No. 2008-210061

SUMMARY

Technical Problem

One among the techniques for displaying important information on the screen is to display a subordinate display area (e.g., floating window) including other information overlaid on the main display area. If, for example, an important on-screen element included in a web page scrolls out of the main display area, such a technique makes it possible to display important information on the screen by displaying a subordinate display area that includes the on-screen element that has scrolled out of the main display area. However, if there are a plurality of important on-screen elements in a web page, and if a subordinate display area appears after these on-screen elements all scroll out of the main display area, a case may occur in which some of the important on-screen elements scroll out of the main display area and, at the same time, do not appear in the subordinate display area. On the other hand, if the subordinate display area appears when some of the important on-screen elements scroll out of the main display area, the same on-screen elements are displayed both in the main and subordinate display areas.

The present invention has been devised in light of the foregoing, and it is an object of the present invention to provide an information processing apparatus which makes it easier to avoid a condition in which the viewing of on-screen elements included in a web page is interfered with, a control method and a control program of the same, and a server device.

Solution to Problem

An information processing apparatus according to the present invention displays a main display area that represents content of a web page on a screen of a display device and includes element identification means and display control means. The element identification means identifies, among a plurality of on-screen elements of interest, an on-screen element of interest that enters or departs from the main display area as the web page is scrolled along a given scrolling direction, when the web page that includes the plurality of on-screen elements of interest and that can be scrolled along the given scrolling direction appears in the main display area. The display control means determines whether or not to include the identified on-screen element of interest as a target to be displayed in a subordinate display area that appears at a position overlapping the main display area in response to the entry or departure of the identified on-screen element of interest into or from the main display area.

Further, an information processing apparatus control method according to the present invention controls an information processing apparatus that displays a main display area that represents content of a web page on a screen of a display device. The control method includes a step of identifying, among a plurality of on-screen elements of interest, an on-screen element of interest that enters or departs from the main display area as the web page is scrolled along a given scrolling direction, when the web page that includes the plurality of on-screen elements of interest and that can be scrolled along the given scrolling direction appears in the main display area. The control method further includes a step of determining whether or not to include the identified on-screen element of interest as a target to be displayed in a subordinate display area that appears at a position overlapping the main display area in response to the entry or departure of the identified on-screen element of interest into or from the main display area.

Still further, a program according to the present invention controls an information processing apparatus that displays a main display area that represents content of a web page on a screen of a display device. The program causes the information processing apparatus to function as element identification means and display control means. The element identification means identifies, among a plurality of on-screen elements of interest, an on-screen element of interest that enters or departs from the main display area as the web page is scrolled along a given scrolling direction, when the web page that includes the plurality of on-screen elements of interest and that can be scrolled along the given scrolling direction appears in the main display area. The display control means determines whether or not to include the identified on-screen element of interest as a target to be displayed in a subordinate display area that appears at a position overlapping the main display area in response to the entry or departure of the identified on-screen element of interest into or from the main display area. The program may be stored in a computer-readable information storage medium to be provided.

Still further, a server device according to the present invention can be connected to a client device and includes delivered data storage means and data transmission means. The delivered data storage means stores data to be delivered. Data to be delivered includes data of a web page including a plurality of on-screen elements of interest and a control program used to control displaying of a subordinate display area. The data transmission means transmits the data to be delivered to the client device in response to a request from the client device. The control program includes a step of identifying, among the plurality of on-screen elements of interest, an on-screen element of interest that enters or departs from a main display area as the web page is scrolled along a given scrolling direction, when the web page appears in the main display area in a manner scrollable along the given scrolling direction. The control program still includes a step of determining whether or not to include the identified on-screen element of interest as a target to be displayed in the subordinate display area that appears at a position overlapping the main display area in response to the entry or departure of the identified on-screen element of interest into or from the main display area.

DESCRIPTION OF EMBODIMENTS

A detailed description will be given below of an embodiment of the present invention with reference to the accompanying drawings.

Figure 1:
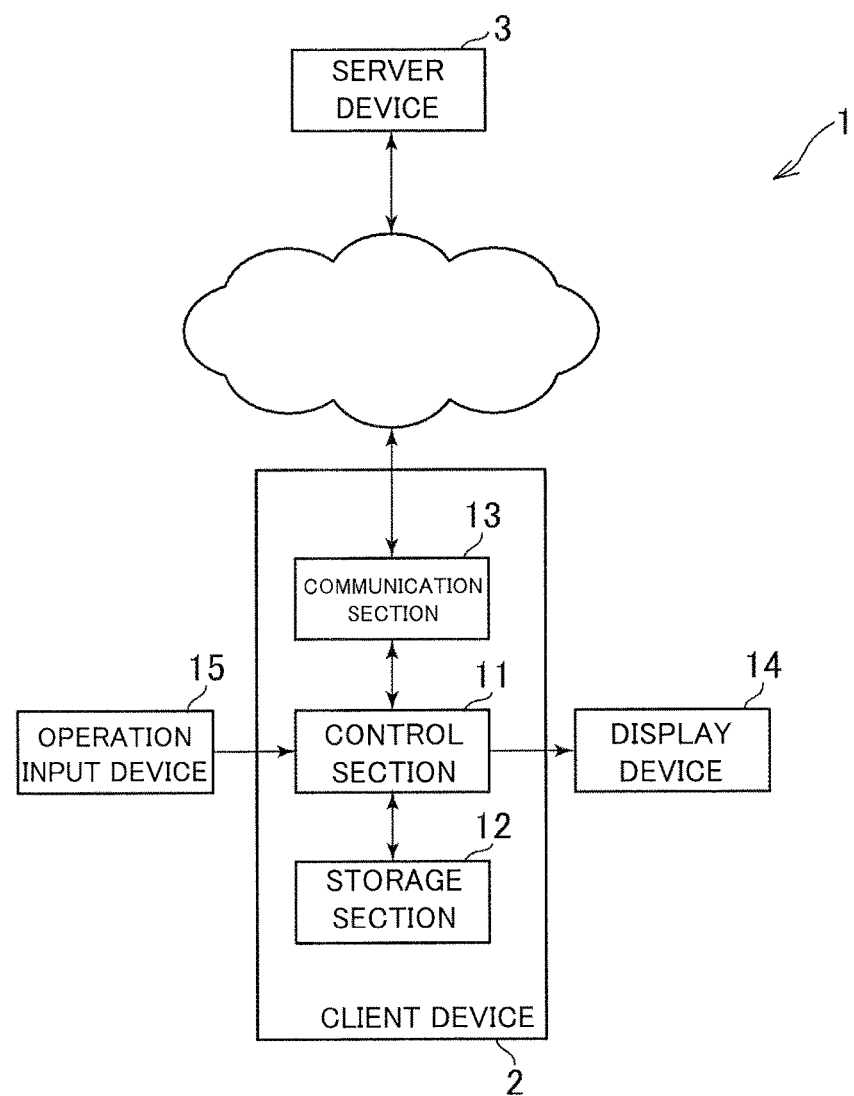
FIG. 1 is an overall configuration diagram of a service provision system that includes an information processing apparatus according to an embodiment of the present invention.

FIG. 1 is an overall configuration diagram of a service provision system 1. As illustrated in FIG. 1, the service provision system 1 includes a client device 2, i.e., an information processing apparatus according to an embodiment of the present invention, and a server device 3. The server device 3 is made available by a service provider. The client device 2 is, for example, a personal computer, a smartphone, or a tablet and includes a control section 11, a storage section 12, and a communication section 13. Further, the client device 2 is connected to a display device 14 and an operation input device 15.

The control section 11 is, for example, a CPU and handles a variety of information processing tasks in accordance with the program stored in the storage section 12. The storage section 12 includes memory elements such as RAM and stores the program executed by the control section 11 and data processed by the program. In the present embodiment in particular, the storage section 12 not only stores a web browser program but also temporarily stores data such as HTML data downloaded from the server device 3.

The communication section 13 is a communication interface such as LAN card. The client device 2 downloads a variety of data from the server device 3 via the communication section 13. The client device 2 and the server device 3 are connected together in such a manner as to be able to communicate with each other via a communication network such as the Internet.

The display device 14 is an LCD panel, organic EL display panel or the like and includes a screen S adapted to display a variety of information in accordance with a video signal transmitted from the client device 2. The operation input device 15 is, for example, a keyboard, a mouse, or a touch panel, receiving a variety of operation inputs from the user of the client device 2 and outputting information representing the content of operation to the client device 2. It should be noted that the display device 14 and the operation input device 15 may be standalone devices separate from the client device 2. Alternatively, these devices may be integral with the client device 2.

The control section 11 of the client device 2 executes the web browser program stored in the storage section 12, thus generating a web page P on the basis of HTML data downloaded from the server device 3 and displays the content of the same page. In the present embodiment in particular, the client device 2 displays the content of the web page P in a main display area that occupies part or the whole of the screen S of the display device 14. Further, the client device 2 displays a subordinate display area in such a manner as to be overlaid on the main display area on the screen S. The subordinate display area is smaller than the main display area. In the description given below, the main and subordinate display areas will be denoted as a main window MW and a sub-window SW, respectively, for reasons of convenience. The main window MW is a display area where the web page P itself appears. On the other hand, the sub-window SW is a display area such as floating window which is arranged in the foreground of the main window MW and is smaller than the main window MW.

Figure 2:
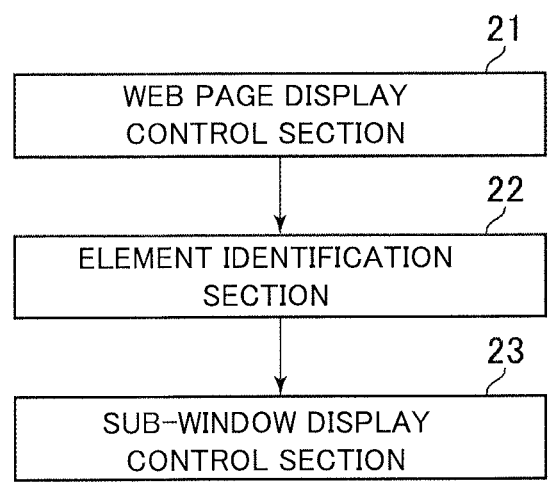
FIG. 2 is a functional block diagram of the information processing apparatus according to the embodiment of the present invention.

The client device 2 functionally includes a web page display control section 21, an element identification section 22, and a sub-window display control section 23 as illustrated in FIG. 2. These functions are implemented as a result of the control section 11 executing the program stored in the storage section 12. In particular, the web page display control section 21 is implemented by the web browser program. On the other hand, the element identification section 22 and the sub-window display control section 23 are implemented as a result of the web browser program interpreting and executing a control program downloaded from the server device 3. This control program may be written in a script such as JavaScript (registered trademark). This script may be embedded in the HTML data to be provided to the client device 2. Alternatively, the script may be stored in a script file separate from the HTML data to be provided to the client device 2.

The web page display control section 21 generates the web page P by interpreting the HTML data downloaded from the server device 3, and displays the generated web page P in the main window MW. Such a web page generation process is implemented by a known rendering engine included in the web browser program. The web page P includes a plurality of on-screen elements E defined by the HTML data. The web page display control section 21 generates the web page P by arranging these on-screen elements E in the web page P. In the present embodiment, the on-screen elements E represent what is included in the content of the web page P and refer to those elements that are actually displayed on the screen S. More specifically, the on-screen elements E are, for example, blocks of text surrounded by paragraph tags in the HTML data, titles, images, tables, and so on. The on-screen elements E may be elements representing the content surrounded by HTML tags that define not inline elements but block-level elements.

In the present embodiment, we assume that the web page P that appears in the main window MW is longer than the main window MW in a given scrolling direction (hereafter referred to as the Y direction) and that the web page P can be scrolled along the scrolling direction. Further, the Y direction here coincides with the vertical direction of the main window MW. In general, the horizontal width of the web page P is fixed to match the horizontal width of the main window MW. Then, if too much content is included in the web page P to fit into the main window MW, the web page P is expanded vertically (in the Y direction).

The web page display control section 21 scrolls the web page P appearing in the main window MW along the Y direction in response to an operation input made by the user to the operation input device 15. This allows the user to display a desired portion of the web page P, whose length in the Y direction is greater than the vertical length of the main window MW, within the main window MW. It should be noted that the web page display control section 21 may automatically scroll the web page P along the Y direction with time irrespective of whether a direct instruction is issued by the user.

Out of the plurality of on-screen elements E included in the web page P, the specific on-screen element E is specified by the creator of the HTML data as an on-screen element of interest NE. The on-screen element of interest NE represents information that is considered particularly important of all information in the web page P. As described earlier, the web page P as a whole does not fit into the main window MW. Therefore, when the user scrolls the web page P, the on-screen element of interest NE in the main window MW may scroll out of (depart from) the main window MW to be out of view. The client device 2 continues to display the on-screen element of interest NE on the screen S even in a case like this as will be described later. In the present embodiment, we assume that the plurality of on-screen elements of interest NE are included in the web page P and that these on-screen elements of interest NE are arranged at different positions along the Y direction. The on-screen element of interest NE may represent, for example, a variety of information such as advertisement which a service provider wishes to announce to a user or information about a user who is currently logged into a service provided by the server device 3. Further, if the web page P is a page of an E-commerce website, the on-screen element of interest NE may be information representing merchandise information and the latest price and inventory of that piece of merchandise. Still further, the on-screen element of interest NE may be a variety of objects (e.g., merchandise purchase button) to be operated by the user.

Figure 3:
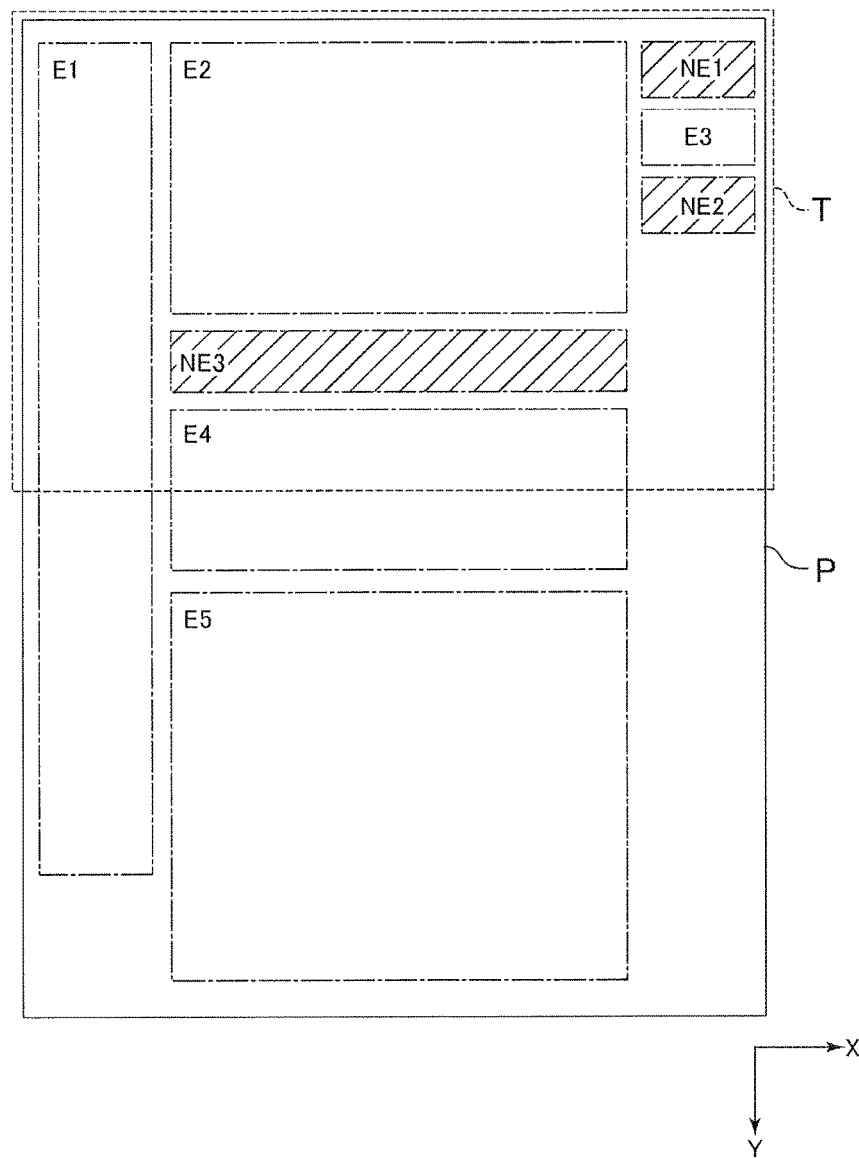
FIG. 3 is a diagram illustrating an example of a web page.

FIG. 3 is a diagram illustrating an example of the web page P generated by the web page display control section 21. The rectangles depicted by long dashed short dashed lines represent the on-screen elements E. Out of these, the ones that are hatched with diagonal lines are the on-screen elements of interest NE. In the example of FIG. 3, the web page P includes five ordinary on-screen elements E1 to E5 and three on-screen elements of interest NE1 to NE3. Further, the rectangle depicted by a dashed line represents a target display area T that appears in the main window MW inside the web page P. In the initial condition, the uppermost portion of the web page P included in the target display area T in FIG. 3 appears in the main window MW. The web page P scrolls vertically relative to the main window MW as the target display area T moves up and down in response to an instruction from the user. It should be noted that, as illustrated in FIG. 3, all the on-screen elements of interest NE are included in the target display area T in the initial condition. Therefore, all the on-screen elements of interest NE appear in the main window MW.

The element identification section 22 identifies, of the plurality of on-screen elements of interest NE included in the web page P, the one that disappears from the main window MW as the web page P scrolls along the Y direction. More specifically, if the web page P in the main window MW scrolls along the Y direction in response to an instruction from the user, the element identification section 22 detects the occurrence of such scrolling. Then, if the on-screen element of interest NE that has been displayed in the main window MW scrolls out of the main window MW as a result of this scrolling, the element identification section 22 identifies which on-screen element of interest NE has scrolled out of the main window MW. As described earlier, the plurality of on-screen elements of interest NE are arranged at different positions along the Y direction. Therefore, if the web page P scrolls along the Y direction in the main window MW, only some of the on-screen elements of interest NE scroll out of the main window MW, and the others remain within the main window MW. In such a case, the element identification section 22 focuses on each of the on-screen elements of interest NE, thus identifying which on-screen element of interest NE has scrolled out of the main window MW.

The sub-window display control section 23 displays the sub-window SW including the content of the on-screen element of interest NE identified by the element identification section 22 at a position overlapping the main window MW. This allows the client device 2 to continuously display, on the screen S, the on-screen element of interest NE that has scrolled out of the main window MW. It should be noted that the sub-window display control section 23 ensures that the content of the on-screen element of interest NE that continuously appears in the main window MW without scrolling out of the main window MW is not included in the sub-window SW. The content of the on-screen element of interest NE to be displayed in the sub-window SW may be extracted from the HTML data that defines the web page P appearing in the main window MW. Alternatively, content thereof may be generated anew on the basis of the HTML data acquired from the server device 3 when the sub-window SW is displayed.

A description will be given below of a specific example of what is displayed in the sub-window SW and where and when the sub-window SW is displayed with reference to the web page P illustrated in FIG. 3.

Figure 4A:
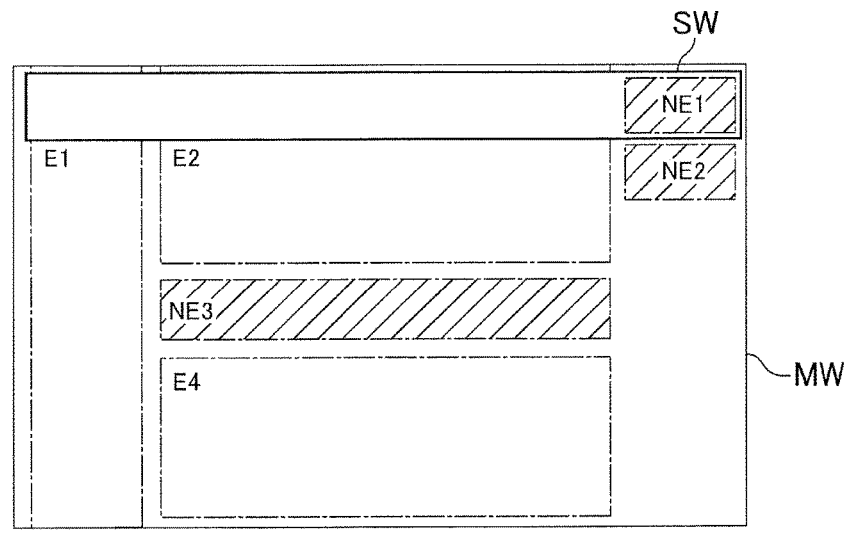
FIG. 4A is a diagram illustrating a display example of a main window and a sub-window.

In the example of FIG. 3, the three on-screen elements of interest NE1 to NE3 are arranged in this order along the Y direction. If the web page P is scrolled down, then the target display area T moves down, causing the on-screen elements of interest NE1 to NE3 to scroll out of the main window MW in this order. For this reason, when the on-screen element of interest NE1 moves out of view of the main window MW, the sub-window display control section 23 displays the sub-window SW including only the content of the on-screen element of interest NE1 at that point in time. FIG. 4A illustrates an example of what is displayed in this case.

Figure 4B:
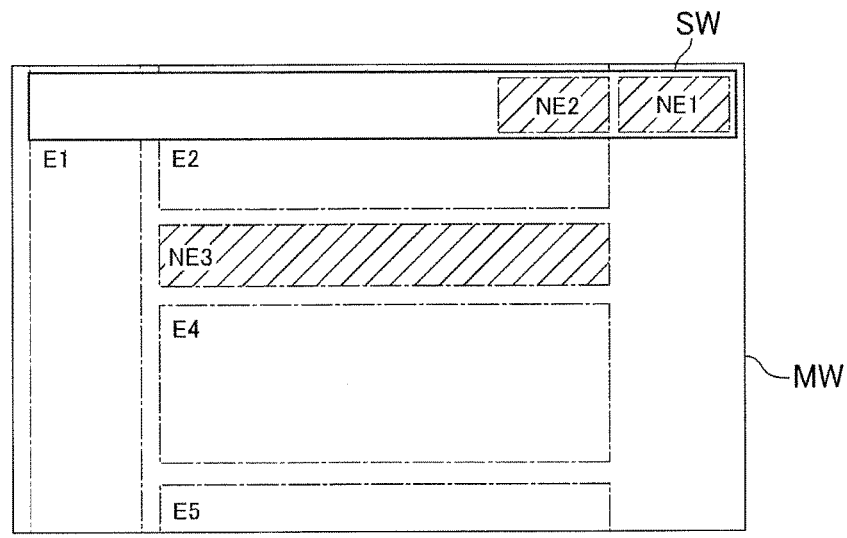
FIG. 4B is a diagram illustrating a display example of a main window and a sub-window.
Figure 4C:
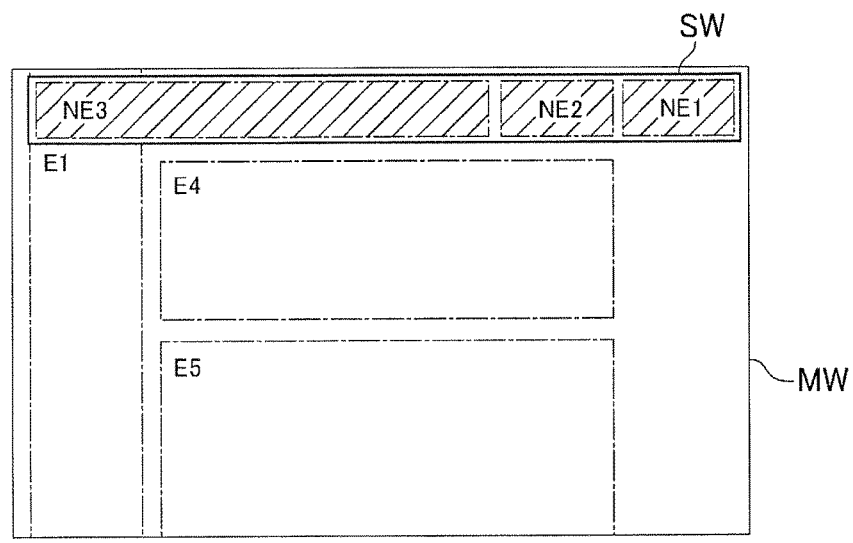
FIG. 4C is a diagram illustrating a display example of a main window and a sub-window.

In this condition, the web page P is scrolled further down. As a result, when the on-screen element of interest NE2 also moves out of view of the main window MW, the sub-window display control section 23 adds the content of the on-screen element of interest NE2 to the sub-window SW that is currently displayed. FIG. 4B illustrates an example of what is displayed at this time. Then, the web page P continues to be scrolled further. As a result, when the on-screen element of interest NE3 also moves out of view of the main window MW, the sub-window display control section 23 adds the content of the on-screen element of interest NE3 to the sub-window SW at that point in time. In this manner, the sub-window SW that includes all the on-screen elements of interest NE contained in the web page P is displayed overlaid on the main window MW. FIG. 4C illustrates an example of what is displayed at this time.

In the examples of FIGS. 4A to 4C, the sub-window display control section 23 determines where to arrange each of the on-screen elements of interest NE in the sub-window SW in such a manner as not to change where each of the on-screen elements of interest NE appears in the X direction, irrespective of the number of the on-screen elements of interest NE included in the sub-window SW. That is, where each of the on-screen elements of interest NE1 to NE3 appears in the sub-window SW is determined in advance. These positions remain unchanged irrespective of how many on-screen elements of interest NE are included in the sub-window SW. Such control prevents the user from losing sight of the specific on-screen element of interest NE regardless of dynamic changes in the number of the on-screen elements of interest NE included in the sub-window SW as a result of scrolling.

If the web page P is scrolled up in the condition illustrated in FIG. 4C, the target display area T moves up, causing the on-screen elements of interest NE1 to NE3 to reappear in the main window MW in the order opposite to that in which they scrolled out of the main window MW. If the on-screen element of interest NE that has been out of view up to then scrolls into view in the main window MW (enters the main window MW) and comes into view as the web page P scrolls, the element identification section 22 identifies this on-screen element of interest NE that has scrolled into the main window MW. Then, the sub-window display control section 23 deletes the identified on-screen element of interest NE from the sub-window SW. This makes it possible to avoid a condition in which the same on-screen element of interest NE appears both in the sub-window SW and the main window MW.

Further, the element identification section 22 may change where the on-screen element of interest NE appears between when determining that the on-screen element of interest NE scrolls out of the main window MW and when determining that the on-screen element of interest NE scrolls into the main window MW. More specifically, for example, the element identification section 22 identifies the on-screen element of interest NE as a target to be displayed in the sub-window SW when the on-screen element of interest NE as a whole including its lower edge scrolls out of the main window MW. Conversely, when this on-screen element of interest NE scrolls back into the main window MW, the element identification section 22 identifies the on-screen element of interest NE as a target to be deleted from the sub-window SW when the on-screen element of interest NE as a whole including its upper edge scrolls into the main window MW. It is possible to ensure that the on-screen element of interest NE does not frequently appear in and disappear from the sub-window SW by adding the on-screen element of interest NE to and deleting it from the sub-window SW at different times as described above.

Figure 5A:
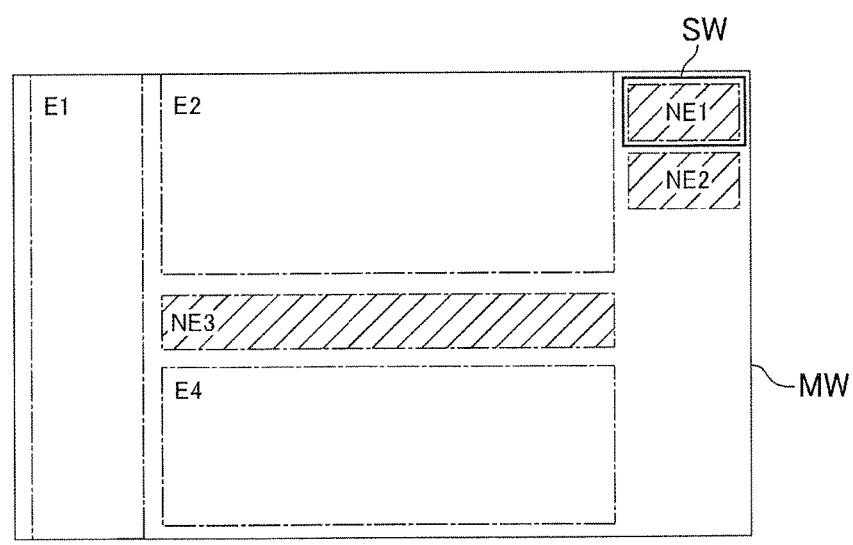
FIG. 5A is a diagram illustrating a display example of a main window and a sub-window.
Figure 5B:
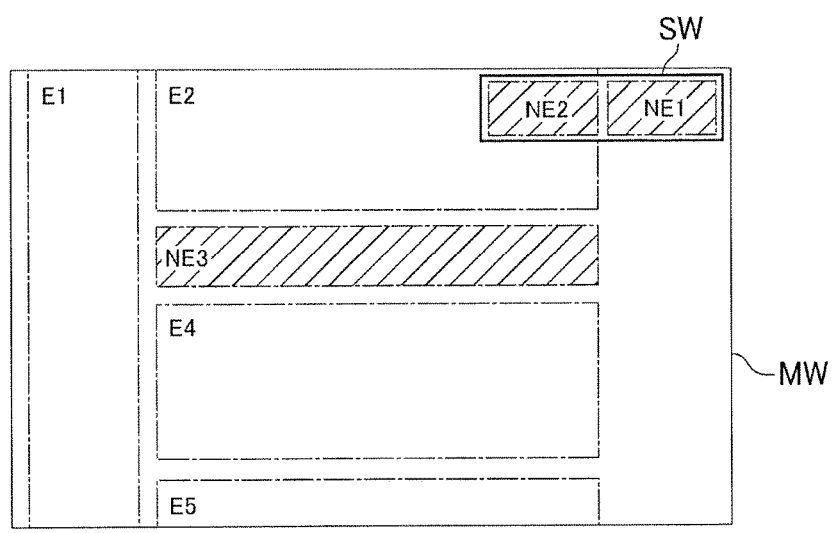
FIG. 5B is a diagram illustrating a display example of a main window and a sub-window.

In the description given above, we assume that although the on-screen elements of interest NE that appear in the sub-window SW change as the web page P scrolls, the size of the sub-window SW itself remains unchanged. However, the sub-window display control section 23 may change the size of the sub-window SW to match the sizes of the on-screen elements of interest NE included in the sub-window SW. FIGS. 5A and 5B illustrate examples of what is displayed in this case. FIG. 5A illustrates an example of what is displayed when only the on-screen element of interest NE1 is included in the sub-window SW as in FIG. 4A. FIG. 5B illustrates an example of what is displayed when only the on-screen elements of interest NE1 and NE2 are included in the sub-window SW as in FIG. 4B. It is possible to reduce the area of the main window MW hidden by the sub-window SW by determining the size of the sub-window SW in accordance with the on-screen elements of interest to be included in the sub-window SW as described above.

Further, the element identification section 22 may identify the on-screen element of interest NE as a target to be displayed in the sub-window SW not only when the on-screen element of interest NE disappears as the web page P scrolls in the main window MW but also when the on-screen element of interest NE is hidden behind the sub-window SW to be out of view as the sub-window display control section 23 displays the sub-window SW. In the web page P illustrated in FIG. 3, for example, the on-screen element E3 which is not an on-screen element of interest is arranged between the on-screen elements of interest NE1 and NE2. If the on-screen element of interest NE2 is located immediately below the on-screen element of interest NE1, and if the sub-window SW as illustrated in FIG. 4A or 5A is displayed overlaid on top of the main window MW, the on-screen element of interest NE2 is hidden behind the sub-window SW to be out of view. In such a case, the element identification section 22 may also identify the on-screen element of interest NE2 as a target to be included in the sub-window SW, and the sub-window display control section 23 may, in response thereto, display the sub-window SW as illustrated in FIG. 4B or 5B. This makes it possible to display all the on-screen elements of interest NE on the screen S.

Further, in the above description, the sub-window display control section 23 displays the sub-window SW at a position overlapping the uppermost portion of the main window MW. However, the sub-window display control section 23 may determine where to arrange the sub-window SW in the Y direction when the web page P scrolls along the Y direction according to the scroll direction. More specifically, the sub-window display control section 23 determines where to arrange the sub-window SW in the Y direction so that the sub-window SW appears in an area, in the main window MW, located on the side opposite to the side toward the direction in which the target display area T set in the web page P moves in accordance with the scroll action. That is, when scrolling is performed so that the on-screen elements E appearing in the main window MW move up as a result of the target display area T moving down, the sub-window SW is arranged within the upper half area of the main window MW (desirably at the upper edge of the main window MW). Conversely, when scrolling is performed so that the on-screen elements E appearing in the main window MW move down as a result of the target display area T moving up, the sub-window SW is arranged within the lower half area of the main window MW (desirably at the lower edge of the main window MW). This makes it possible to display the sub-window SW in such a manner that the content of the web page P that newly scrolls into the main window MW is not hidden. It should be noted that, even in this case, it is possible to make it less likely that the user may lose sight of the on-screen elements of interest NE by ensuring that the on-screen elements of interest NE appear at the same positions in the X direction within the sub-window SW.

Figure 6:
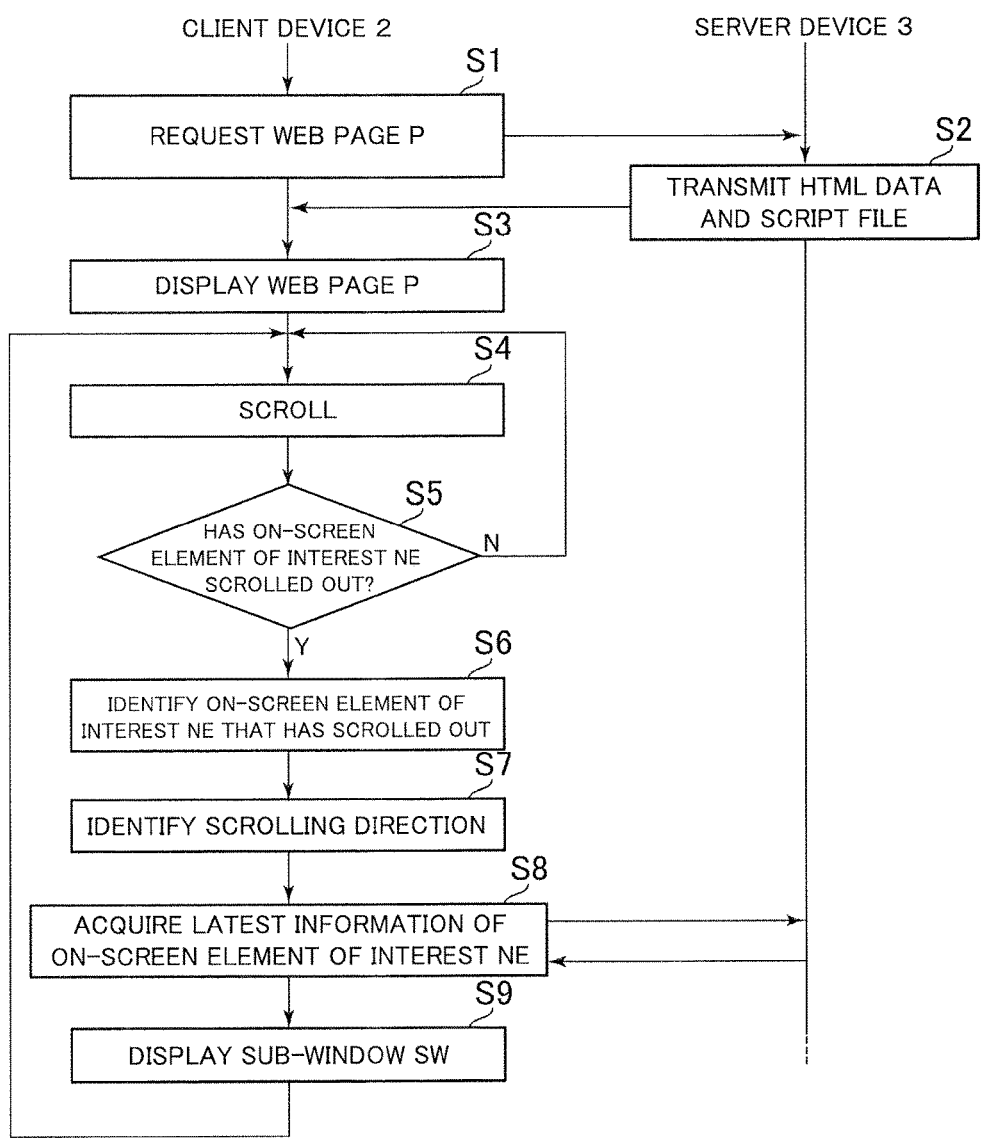
FIG. 6 is a diagram illustrating an example of flow of a process performed by the service provision system.

A description will be given below of a specific example of flow of a process performed by the client device 2 and the server device 3 in the present embodiment with reference to the flowchart in FIG. 6.

First, the web page display control section 21 of the client device 2 transmits a request for the web page P (HTTP request) to the server device 3 in response, for example, to an instruction by the user (S1). In response to this request, the server device 3 transmits HTML data and a script file to the client device 2 (S2). The HTML data defines the content of the web page P. The script file includes a control program for controlling the display of the sub-window SW. It should be noted that if the content of the web page P is dynamic, the server device 3 may generate new HTML data that defines the content of the web page P in accordance with parameters and other data included in the request transmitted in S1 and then transmit the generated HTML data to the client device 2.

The web page display control section 21 of the client device 2 generates the web page P on the basis of the HTML data received from the server device 3 in S2, displaying the web page P in the main window MW (S3).

Then, while the web page P appears, the element identification section 22 monitors whether the web page P scrolls. When the web page display control section 21 scrolls the web page P in response to an operation input to the operation input device 15 from the user (S4), the element identification section 22 determines whether the predetermined on-screen element of interest NE has scrolled out of the main window MW as a result of scrolling (S5). If none of the on-screen elements of interest NE has scrolled out, control returns to before S4 to continuously monitor the scrolling. On the other hand, when determining that the predetermined on-screen element of interest NE has scrolled out of the main window MW, the element identification section 22 identifies which on-screen element of interest NE has scrolled out (S6). At the same time, the element identification section 22 identifies the scrolling direction in S4 (S7). The sub-window display control section 23 acquires the latest information of the on-screen element of interest NE identified in S6 from the server device 3 (S8). It should be noted that this process is required if the content of the on-screen element of interest NE is dynamic information that changes over time. On the other hand, however, when the content of the on-screen element of interest NE is static information, this process is not always necessary. Next, the sub-window display control section 23 displays the sub-window SW representing the content of the on-screen element of interest NE acquired in S8 at the display position determined in accordance with the scrolling direction identified in S7 (S9). Then, control returns to before S4 to continuously monitor the scrolling.

In the embodiment of the present invention described above, of the on-screen elements of interest NE included in the web page P, the one that disappears from the main window MW as the web page P scrolls is identified, and the identified on-screen element of interest NE is selectively displayed in such a manner as to be included in the sub-window SW. This makes it possible to display all the on-screen elements of interest NE on the screen S and ensure that each thereof is included only in either the sub-window SW or the main window MW.

It should be noted that embodiments of the present invention are not limited to that described above. In the above description, for example, we assumed that the web page P was longer than the main window MW in the Y direction (vertical direction of the main window MW), and that the web page P was scrolled in this direction. However, the web page P may be longer than the main window MW in the X direction and be scrolled in the X direction. In this case, we assume that the on-screen elements of interest NE are arranged at different positions along the X direction.

Further, in the above description, we assumed that the control program for implementing the element identification section 22 and the sub-window display control section 23 was transmitted from the server device 3 to the client device 2 together with HTML data that defines the web page P. However, the client device 2 may acquire the control program by other method. As a specific example, this control program may be supplied in the form of an auxiliary program (e.g., add-on program) that works in coordination with the web browser program. In this case, the client device 2 downloads the auxiliary program from the server device 3 that supplies the HTML data or from other server device and installs it in advance. Then, the client device 2 implements the functions of the element identification section 22 and the sub-window display control section 23 by executing the auxiliary program installed in advance when downloading the HTML data from the server device 3 and displaying the web page P in the main window MW.

REFERENCE SIGNS LIST

1: Service provision system
2: Client device
3: Server device
11: Control section
12: Storage section
13: Communication section
14: Display device
15: Operation input device
21: Web page display control section
22: Element identification section
23: Sub-window display control section

The invention claimed is:

1. An information processing apparatus for displaying a main display area that represents content of a web page on a screen of a display device, the information processing apparatus comprising:
   at least one memory operable to store computer program code; and
   at least one processor operable to access said at least one memory and carry out said computer program code, said computer program code including:
   element identification code configured to cause at least one of said at least one processor to:
      identify, among a plurality of on-screen elements, at least one on-screen element that departs from the main display area as the web page is scrolled along a given scrolling direction, and
      determine, when at least two on-screen elements of the plurality of on-screen elements depart from the main display area, an order of departure of the at least two on-screen elements; and
   display control code configured to cause at least one of said at least one processor to:

determine whether to display the identified at least one on-screen element in a subordinate display area that appears at a position overlapping the main display area in response to the departure of the identified at least one on-screen element, and when the web page is scrolled in a direction opposite to the given scrolling direction, cause the at least two on-screen elements to reappear in the main display area from the subordinate display area, in an order opposite to the order of departure, and delete the at least two on-screen elements from the subordinate display area, wherein the display control code is further configured to cause at least one of said at least one processor to, with respect to the at least two on-screen elements of the plurality of on-screen elements arranged at different positions along the given scrolling direction in the main display area, determine in advance a relative position of each of the at least two on-screen elements in such a manner that the at least two on-screen elements are arranged in a direction intersecting the given scrolling direction when displayed in the subordinate display area, wherein the at least two on-screen elements include a first on-screen element and a second on-screen element that are adjacent to each other along the given scrolling direction, the first on-screen element and the second on-screen element being arranged side-by-side along the direction intersecting the given scrolling direction when displayed in the subordinate display area, and wherein the element identification code is further configured to cause at least one of said at least one processor to display the identified at least one on-screen element in the subordinate display area when the at least one on-screen element as a whole including its upper or lower edge departs from the main display area, and delete each of the at least two on-screen elements from the subordinate display area when each of the at least two on-screen elements as a whole including its lower or upper edge reappears in the main display area.

2. The information processing apparatus of claim 1, wherein
the display control code is further configured to cause at least one of said at least one processor to determine a size of the subordinate display area to match a size of the identified at least one on-screen element included in the subordinate display area.

3. The information processing apparatus of claim 1, wherein
the display control code is further configured to cause at least one of said at least one processor to determine an arrangement of the subordinate display area in accordance with the given scrolling direction.

4. The information processing apparatus of claim 1, wherein
the display control code is further configured to cause at least one of said at least one processor to not change a location of the at least one on-screen element included in the subordinate display area, irrespective of a number of the at least one on-screen element added in the subordinate display area.

5. The information processing apparatus of claim 1, wherein
the display control code is further configured to cause at least one of said at least one processor to determine a size of the subordinate display area to match a size of the at least one on-screen element included in the subordinate display area.

6. An information processing apparatus control method for controlling an information processing apparatus that displays a main display area that represents content of a web page on a screen of a display device, the information processing apparatus control method executed by at least one processor and comprising:

identifying, among a plurality of on-screen elements, at least one on-screen element that departs from the main display area as the web page is scrolled along a given scrolling direction;

determining, when at least two on-screen elements of the plurality of on-screen elements depart from the main display area, an order of departure of the at least two on-screen elements;

determining whether to display the identified at least one on-screen element in a subordinate display area that appears at a position overlapping the main display area in response to the departure of the identified at least one on-screen element; and when the web page is scrolled in a direction opposite to the given scrolling direction, causing the at least two on-screen elements to reappear in the main display area from the subordinate display area, in an order opposite to the order of departure, and deleting the at least two on-screen elements from the subordinate display area, wherein the information processing apparatus control method further comprises determining in advance, with respect to the at least two on-screen elements of the plurality of on-screen elements arranged at different positions along the given scrolling direction in the main display area, determine in advance a relative position of each of the at least two on-screen elements in such a manner that the at least two on-screen elements are arranged in a direction intersecting the given scrolling direction when displayed in the subordinate display area, wherein the at least two on-screen elements include a first on-screen element and a second on-screen element that are adjacent to each other along the given scrolling direction, the first on-screen element and the second on-screen element being arranged side-by-side along the direction intersecting the given scrolling direction when displayed in the subordinate display area, and wherein the information processing apparatus control method further comprises displaying the identified at least one on-screen element in the subordinate display area when the at least one on-screen element as a whole including its upper or lower edge departs from the main display area, and deleting each of the at least two on-screen elements from the subordinate display area when each of the at least two on-screen elements as a whole including its lower or upper edge reappears in the main display area.

7. A non-transitory computer-readable information storage medium that stores a program for controlling at least one processor in an information processing apparatus that displays a main display area that represents content of a web page on a screen of a display device, the program causing the information processing apparatus to:

identify, among a plurality of on-screen elements, at least one on-screen element that departs from the main display area as the web page is scrolled along a given scrolling direction;

determine, when at least two on-screen elements of the plurality of on-screen elements depart from the main display area, an order of departure of the at least two on-screen elements;

determine whether to display the identified at least one on-screen element in a subordinate display area that appears at a position overlapping the main display area in response to the departure of the identified at least one on-screen element; and when the web page is scrolled in a direction opposite to the given scrolling direction, cause the at least two on-screen elements to reappear in the main display area from the subordinate display area, in an order opposite to the order of departure, and delete the at least two on-screen elements from the subordinate display area, wherein the program further causes the information processing apparatus to, with respect to the at least two on-screen elements of the plurality of on-screen elements arranged at different positions along the given scrolling direction in the main display area, determine in advance a relative position of each of the at least two on-screen elements in such a manner that the at least two on-screen elements are arranged in a direction intersecting the given scrolling direction when displayed in the subordinate display area, wherein the at least two on-screen elements include a first on-screen element and a second on-screen element that are adjacent to each other along the given scrolling direction, the first on-screen element and the second on-screen element being arranged side-by-side along the direction intersecting the given scrolling direction when displayed in the subordinate display area, and wherein the program further causes the information processing apparatus to display the identified at least one on-screen element in the subordinate display area when the at least one on-screen element as a whole including its upper or lower edge departs from the main display area, and delete each of the at least two on-screen elements from the subordinate display area when each of the at least two on-screen elements as a whole including its lower or upper edge reappears in the main display area.

8. A server device that can be connected to a client device, the server device comprising:

delivered data memory that stores data to be delivered that includes data of a web page including a plurality of on-screen elements and a control program used to control displaying of a subordinate display area, said server device comprising at least one processor and transmitting the data to be delivered to the client device in response to a request from the client device, wherein the control program includes code that causes at least one of at least one processor of said client device to:

identify, among the plurality of on-screen elements, at least one on-screen element that departs from a main display area as the web page is scrolled along a particular scrolling direction;

determine, when at least two on-screen elements of the plurality of on-screen elements depart from the main display area, an order of departure of the at least two on-screen elements;

determine whether to display the identified at least one on-screen element in the subordinate display area that appears at a position overlapping the main display area in response to the departure of the identified at least one on-screen element; and when the web page is scrolled in a direction opposite to the particular scrolling direction, cause the at least two on-screen elements to reappear in the main display area from the subordinate display area, in an order opposite to the order of departure, and delete the at least two on-screen elements from the subordinate display area, wherein the control program further causes at least one of said at least one processor of said client device to, with respect to the at least two on-screen elements of the plurality of on-screen elements arranged at different positions along the given scrolling direction in the main display area, determine in advance a relative position of each of the at least two on-screen elements in such a manner that the at least two on-screen elements are arranged in a direction intersecting the given scrolling direction when displayed in the subordinate display area, wherein the at least two on-screen elements include a first on-screen element and a second on-screen element that are adjacent to each other along the given scrolling direction, the first on-screen element and the second on-screen element being arranged side-by-side along the direction intersecting the given scrolling direction when displayed in the subordinate display area, and wherein the control program further causes at least one of said at least one processor of said client device to display the identified at least one on-screen element in the subordinate display area when the at least one on-screen element as a whole including its upper or lower edge departs from the main display area, and delete each of the at least two on-screen elements from the subordinate display area when each of the at least two on-screen elements as a whole including its lower or upper edge reappears in the main display area.

* * * * *